United States Patent
Suchecki

(10) Patent No.: US 8,622,235 B2
(45) Date of Patent: Jan. 7, 2014

(54) INSULATED CONTAINER AND INSERT

(76) Inventor: Glen R. Suchecki, Wall Township, NJ (US)

( * ) Notice: Subject to any disclaimer, the term of this patent is extended or adjusted under 35 U.S.C. 154(b) by 62 days.

(21) Appl. No.: 13/426,313

(22) Filed: Mar. 21, 2012

(65) Prior Publication Data

US 2013/0247606 A1 Sep. 26, 2013

(51) Int. Cl.
*B65D 83/72* (2006.01)

(52) U.S. Cl.
USPC .................... 220/592.23; 220/528; 383/110

(58) Field of Classification Search
USPC .................... 220/592.2, 592.23, 592.24, 528; 383/110, 111
See application file for complete search history.

(56) References Cited

U.S. PATENT DOCUMENTS

| | | | | |
|---|---|---|---|---|
| 2,575,893 A * | 11/1951 | Seaman | ........................... | 383/25 |
| 2,645,332 A * | 7/1953 | Martin et al. | ................. | 206/545 |
| 3,255,607 A * | 6/1966 | Bair et al. | ........................ | 62/372 |
| 3,759,356 A * | 9/1973 | Bostick et al. | ................ | 190/111 |
| 4,050,264 A * | 9/1977 | Tanaka | ........................... | 62/457.2 |
| 4,648,121 A * | 3/1987 | Lowe | ............................... | 383/76 |
| 4,673,117 A * | 6/1987 | Calton | ....................... | 224/148.3 |
| 4,716,947 A * | 1/1988 | Haddock | ....................... | 150/106 |
| 4,872,589 A * | 10/1989 | Englehart et al. | ........ | 229/117.13 |
| 4,929,094 A | 5/1990 | Becker | | |
| 5,090,526 A * | 2/1992 | Jacober | ......................... | 190/107 |
| 5,160,001 A * | 11/1992 | Marceau | ....................... | 190/102 |
| D345,651 S * | 4/1994 | Copp | ............................ | D3/285 |
| 5,400,610 A * | 3/1995 | Macedo | ........................... | 62/130 |
| 5,403,095 A * | 4/1995 | Melk | .............................. | 383/110 |
| 5,421,172 A * | 6/1995 | Jones | .......................... | 62/457.5 |
| 5,501,338 A * | 3/1996 | Preston | ......................... | 206/545 |
| 5,526,907 A * | 6/1996 | Trawick et al. | ............... | 190/111 |
| 5,671,611 A * | 9/1997 | Quigley | ........................ | 62/457.7 |
| 5,842,571 A | 12/1998 | Rausch | | |
| 5,911,262 A * | 6/1999 | Steinhart | ....................... | 150/103 |
| 5,967,270 A * | 10/1999 | Shyr | .............................. | 190/109 |
| 6,015,072 A * | 1/2000 | Young | ............................ | 224/153 |
| 6,048,099 A * | 4/2000 | Muffett et al. | .................. | 383/20 |
| 6,068,402 A * | 5/2000 | Freese et al. | .................. | 383/110 |
| 6,213,268 B1 * | 4/2001 | Dancyger | ...................... | 190/110 |
| 6,237,776 B1 * | 5/2001 | Mogil | .......................... | 206/579 |
| 6,238,091 B1 * | 5/2001 | Mogil | .......................... | 383/110 |
| 6,247,328 B1 * | 6/2001 | Mogil | ........................... | 62/457.2 |

(Continued)

OTHER PUBLICATIONS

Website, www.webrestaurantstore.com/insulated-food-delivery-bag-pan-carrier/124FCARRIER.html, Insulated Food Delivery Bag/Pan Carrier, five sheets printed from the Internet on Nov. 21, 2011.

*Primary Examiner* — Anthony Stashick
*Assistant Examiner* — Christopher McKinley
(74) *Attorney, Agent, or Firm* — Richard C. Litman

(57) ABSTRACT

The insulated container and insert are formed of relatively soft and flexible panels having relatively thick cores of thermal insulation captured between thin impervious sheets. The outer container has a closable top, and the insert has an open top. The insert is about half the height of the outer container, allowing ice or other cooling material, beverage cans and/or bottles, etc., to be placed in the bottom of the outer container with the insert resting thereon for the carriage of food therein. As the outer bottom surface of the insert will be moist from contact with ice or the like therebelow, the outer container includes a drop down panel that may be lowered for placement of the insert thereon to preclude contamination of the bottom of the insert with loose sand or the like. Additional carrying handles and straps are provided, as well as outer pockets on the outer container.

6 Claims, 4 Drawing Sheets

(56) References Cited

U.S. PATENT DOCUMENTS

| | | | |
|---|---|---|---|
| 6,296,165 B1 * | 10/2001 | Mears | 224/610 |
| 6,349,559 B1 | 2/2002 | Hasanovic | |
| 6,435,390 B1 * | 8/2002 | Abramowicz | 224/629 |
| 6,481,239 B2 * | 11/2002 | Hodosh et al. | 62/457.4 |
| 6,582,124 B2 * | 6/2003 | Mogil | 383/110 |
| 6,595,604 B1 * | 7/2003 | Peterson | 312/3 |
| 6,612,434 B1 * | 9/2003 | Redzisz | 206/315.11 |
| 6,644,063 B2 * | 11/2003 | Mogil | 62/457.2 |
| 6,749,273 B1 * | 6/2004 | Peterson | 312/3 |
| 6,782,711 B2 * | 8/2004 | Abfalter | 62/457.7 |
| 7,162,890 B2 * | 1/2007 | Mogil et al. | 62/457.7 |
| 7,240,513 B1 * | 7/2007 | Conforti | 62/457.2 |
| 7,677,406 B2 * | 3/2010 | Maxson | 220/592.26 |
| D619,854 S | 7/2010 | Koehler et al. | |
| 7,815,069 B1 * | 10/2010 | Bellofatto et al. | 220/666 |
| 8,061,547 B2 * | 11/2011 | Camp, Jr. | 220/507 |
| 8,191,747 B2 * | 6/2012 | Pruchnicki | 224/612 |
| 8,191,762 B2 * | 6/2012 | Philips | 229/120.11 |
| 8,348,510 B2 * | 1/2013 | Mogil | 383/38 |
| 8,459,058 B2 * | 6/2013 | Mogil | 62/457.7 |
| 2003/0024960 A1 * | 2/2003 | Greenstein et al. | 224/153 |
| 2004/0025530 A1 | 2/2004 | Perrins | |
| 2004/0074936 A1 * | 4/2004 | McDonald | 224/148.5 |
| 2005/0103044 A1 * | 5/2005 | Mogil et al. | 62/457.7 |
| 2008/0047296 A1 | 2/2008 | Helmer | |
| 2008/0134714 A1 | 6/2008 | Villanueva | |
| 2011/0011856 A1 * | 1/2011 | Rothschild et al. | 220/7 |
| 2011/0016911 A1 | 1/2011 | Mosby | |
| 2011/0259898 A1 * | 10/2011 | Mogil et al. | 220/592.03 |

* cited by examiner

INSULATED CONTAINER AND INSERT

BACKGROUND OF THE INVENTION

1. Field of the Invention

The present invention relates to portable, hand-carried containers and the like, and particularly to an insulated container and insert therefor for the carriage of food, drink, ice, and/or other articles therein.

2. Description of the Related Art

The keeping and carriage of food and beverages for various functions has advanced over the years from the traditional picnic basket, to more sophisticated containers better adapted to maintain the quality of the goods carried therein. In relatively recent times, greater concern has developed regarding the maintenance of food at proper temperatures due to potential bacterial growth and resulting illness from consuming such foods. Aside from the aspect of health concerns, food that is maintained at the proper temperature up to the point of consumption is just more pleasant to eat, e.g., keeping a hot dish hot or at least warm, and maintaining the cold or at least cool temperature of a soft drink or the like.

Accordingly, a number of thermally insulated containers for the temporary carriage and storage of various foods and beverages have been developed in the relatively recent past. Many, if not most, of these devices have been constructed of relatively rigid panels of plastic foam, providing for an inexpensive yet reasonably efficient thermal insulation for the foods and beverages stored and carried therein. Such containers are difficult and cumbersome to store when not needed, and are often much larger than required for a relatively small amount of food or drink. Moreover, they generally fail to provide any separation between foods stored therein and ice carried within the container to keep the food cool. This usually results in the food becoming soggy and unpalatable as the ice melts, unless the food is extremely well protected by additional smaller containers carried within the larger container.

Thus, an insulated container and insert solving the aforementioned problems is desired.

SUMMARY OF THE INVENTION

The insulated container and insert includes an outer container having a closable lid or top, and an open top insert removably placed therein. Both the outer container and the insert are formed of relatively soft and flexible thermally insulated material having relatively thick thermal insulation captured between thin outer sheets. The outer sheets are preferably waterproof. Laterally opposed carrying handles are provided for both the outer container and the insert. The outer container also is provided with a removable shoulder carriage strap. The outer container has opposite end pockets. One of the pockets is actually a double pocket, and the opposite pocket is formed of a mesh material. The outer container further includes a drop down side panel that serves as a resting surface for the placement of the insert thereon.

The outer container is adapted for the placement of ice and/or other cooling agents in the bottom portion thereof, along with beverage cans and/or bottles that will be in contact with the ice. The insert has a depth of about half that of the outer container, and is adapted to rest atop the ice and/or beverage containers placed in the bottom of the outer container. The flexible nature of the material of which the outer container and insert are formed allows the insert to be manufactured to fit very closely within the outer container, thus providing a reasonably good seal therebetween to prevent any significant air circulation to the underlying ice and beverage container compartment when the insert is installed in the outer container. The buoyancy of the insert atop the underlying ice and ice water in the bottom of the outer container assures that little, if any, air remains beneath the insert, thus increasing the insulating efficiency of the assembly.

As the outer bottom surface of the insert rests atop any ice and/or other cold articles contained within the lower volume of the outer container, the insert bottom surface will have some moisture thereon when lifted from the outer container. The drop down side panel of the outer container provides a clean resting surface for placement of the insert thereon to preclude the adhesion of loose sand, soil, etc. to the bottom of the insert when removed from the outer container.

The insulated container and insert may be adapted for the temporary carriage and storage of any number of various foods and beverages, but is preferably adapted particularly for the carriage of relatively large, elongate submarine sandwiches ("subs") within the insert, while also carrying accompanying beverages within the outer container below the insert. Accordingly, the insert has a length of about sixteen inches, a width of about half that, and a height of about six inches. The outer container is dimensioned accordingly in order to fit closely about the insert when the insert is installed within the outer container. It will be understood that these dimensions are exemplary for the carriage of submarine sandwiches or the like therein, and the insulated container and insert may be dimensioned to any practicable size and shape.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The insulated container and insert comprises a closable and sealable outer bag, and an open insert removably installed therein. The outer bag and insert are both made of flexible laminates of conventional material. The outer ply of the outer bag may be formed of a durable woven fabric material, e.g., Nylon® or the like. The outer ply of the outer bag may be plasticized to seal it against moisture and vapor penetration. The inner ply or liner of the outer bag is formed of a waterproof sheet of material. The inner and outer plies capture a soft, flexible, thermally insulating blanket core therebetween, e.g., flexible polyurethane foam or the like. The insert is formed of comparable materials, but the outer ply of the insert comprises a waterproof sheet of material similar in its property to the inner sheet of the outer bag. Such thermally insulating, flexible laminates are conventional and well known in the art.

Figure 1:
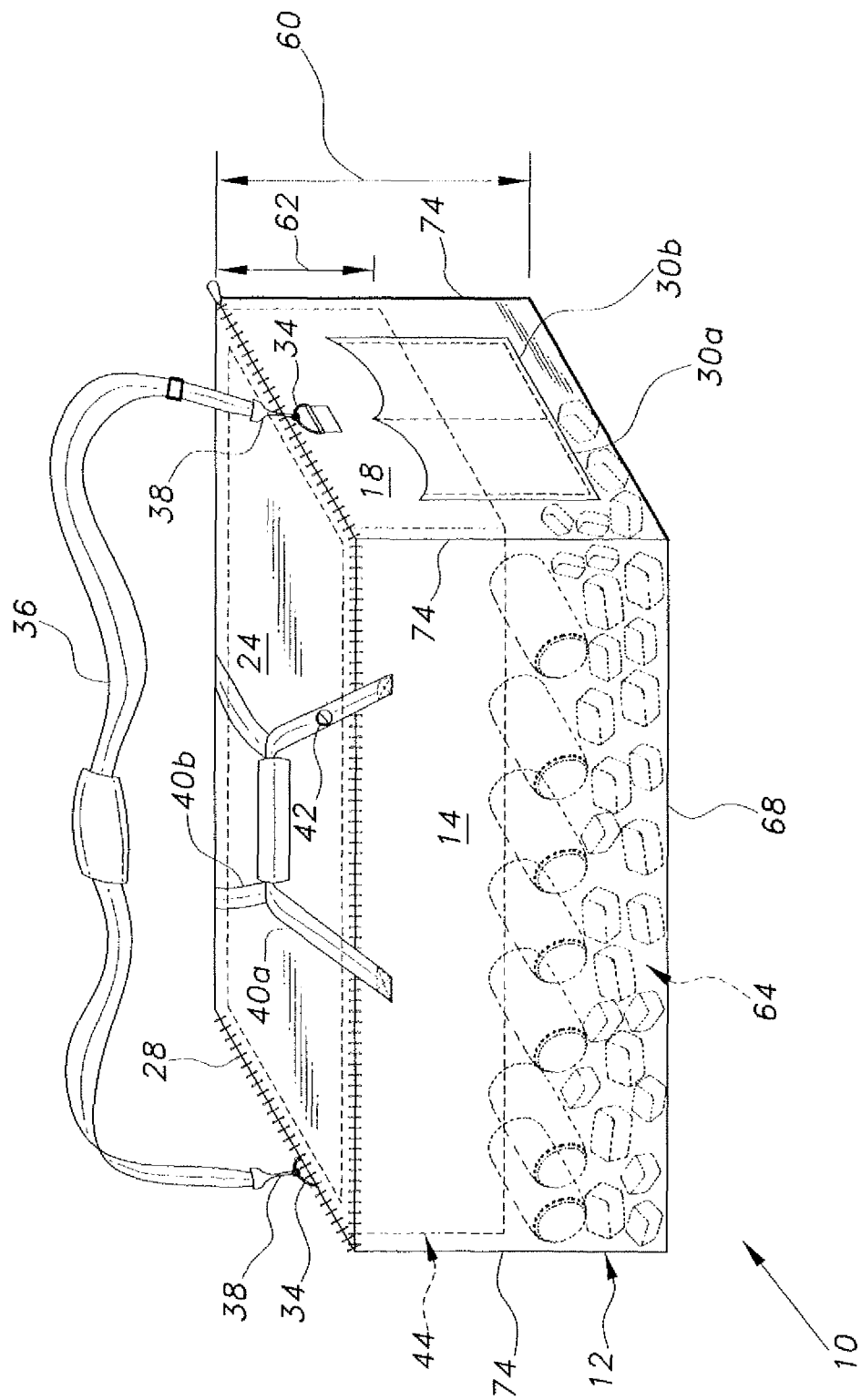
FIG. 1 is a perspective view of an insulated container and insert according to the present invention, showing the outer container closed, the insert and other articles contained therein being shown in broken lines.

FIG. 1 of the drawings provides a perspective view of the insulated container and insert 10 assembly, comprising the outer bag 12 and an insert shown therein in broken lines and described in detail further below. The outer bag 12 includes mutually opposed first and second side panels 14 and 16. The second side panel 16 is shown more clearly in FIG. 4 of the drawings. Mutually opposed first and second end panels 18 and 20 define the ends of the outer bag 12, the second end panel 20 being shown in FIGS. 3 and 4 of the drawings. A bottom panel 22 and an opposite openable top panel 24 complete the outer bag 12. The panels 14 through 24 define an outer bag volume 26 therein, as indicated in the open outer bag 12 of FIG. 2. Each of these panels 14 through 24 is formed of outer and inner sheets or plies of flexible material sandwiching a soft, flexible, thermally insulating core material therebetween, as described further above.

Figure 3:
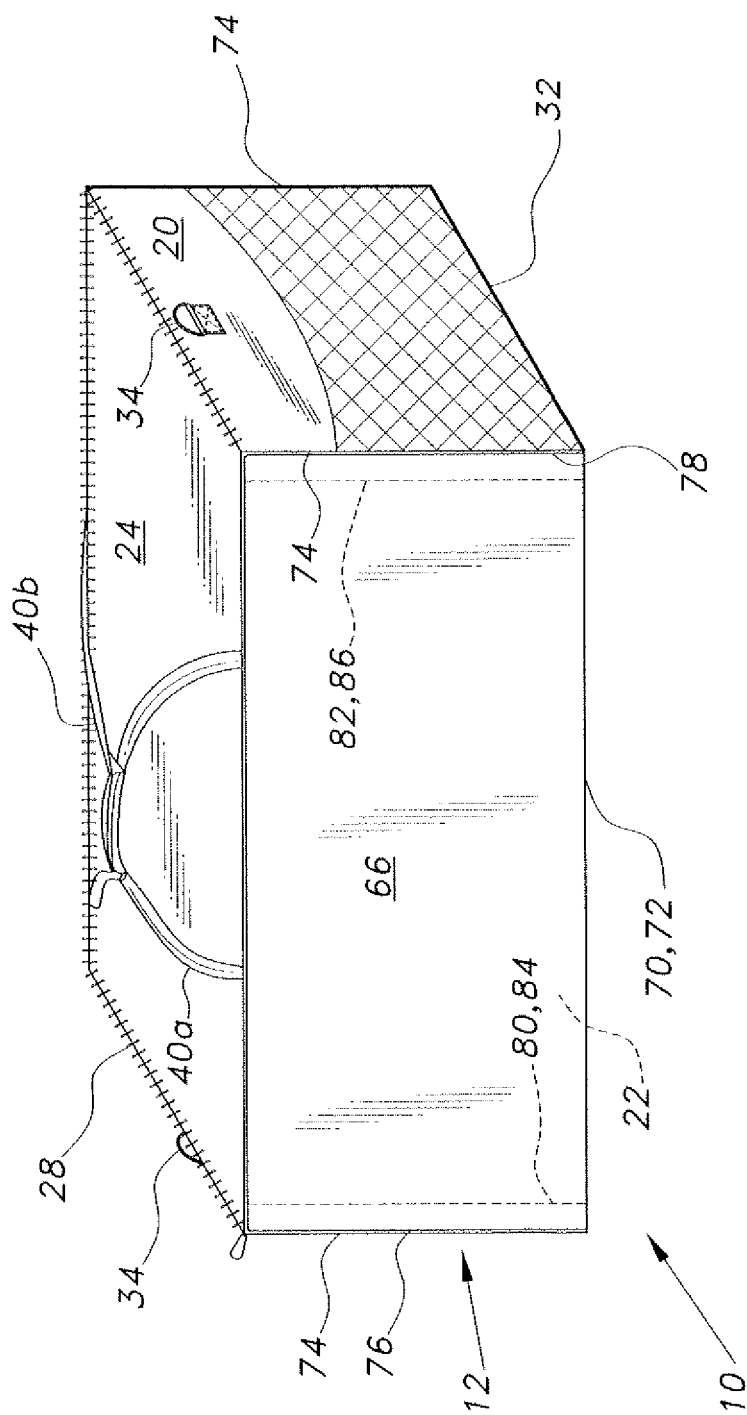
FIG. 3 is a perspective view of the insulated container and insert according to the present invention as seen from the rear of the container, showing the outer container and drop down panel in a closed configuration.
Figure 4:
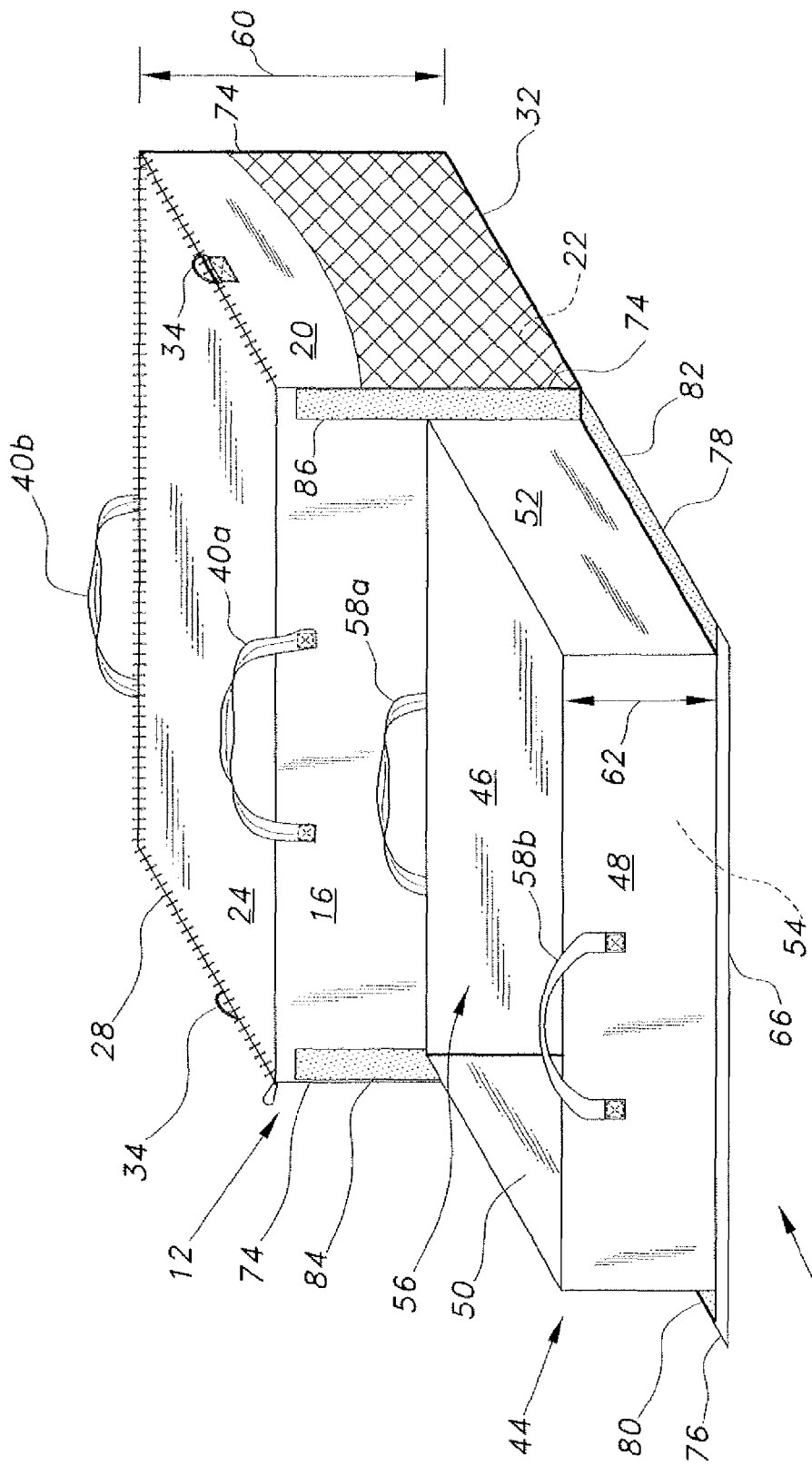
FIG. 4 is a perspective view of the insulated container and insert according to the present invention as seen from the rear, showing the drop down panel open and the insert resting thereon.

The outer bag 12 includes a number of features that add convenience and utility to the container and insert 10 assembly. The top panel 24 may be closed over the top of the outer bag 12 by a zipper 28 that substantially seals the interior volume 26 of the outer bag 12 when the zipper 28 is closed. The first end panel 18 includes a pair of joined but laterally separated pockets 30a and 30b attached external thereto. The two pockets are very convenient for the carriage of various condiments or other articles therein. The opposite second end panel 20 includes a larger external mesh pocket 32 for the carriage of various articles therein, as shown in FIGS. 3 and 4 of the drawings. The end panels 18 and 20 are equipped with respective first and second strap attachments comprising D-rings 34 for the removable attachment of a shoulder strap 36 thereto, as shown in FIG. 1. The shoulder strap 36 is adjustable in length and attaches to the D-rings 34 by conventional snap hooks 38 or the like. The outer bag 12 is also equipped with laterally opposed first and second handle straps 40a and 40b extending from the upper edges or portions of the first and second side panels 14 and 16. The two handle straps 40a, 40b may be provided with a wraparound grip to facilitate handling the outer bag 12, if desired. A bottle opener 42 may be provided on one of the handles, e.g., the first handle 40a, as shown in FIGS. 1 and 2, for the convenience of the user of the device.

An open top insert 44 is removably installed within the outer bag 12. The insert 44 is shown installed in the bag 12 in broken lines in FIG. 1, and removed from the bag 12 in FIGS. 2 and 4. The insert 44 is formed of similar materials to those of the outer bag 12, i.e., a soft, flexible thermally insulating core material sandwiched between an outer sheet and an inner liner. Such materials are conventional and well known in the art, as noted further above. However, the outer sheet or surface of the insert 44 comprises a waterproof material, e.g., plastic sheet, etc, for reasons described further below.

Figure 2:
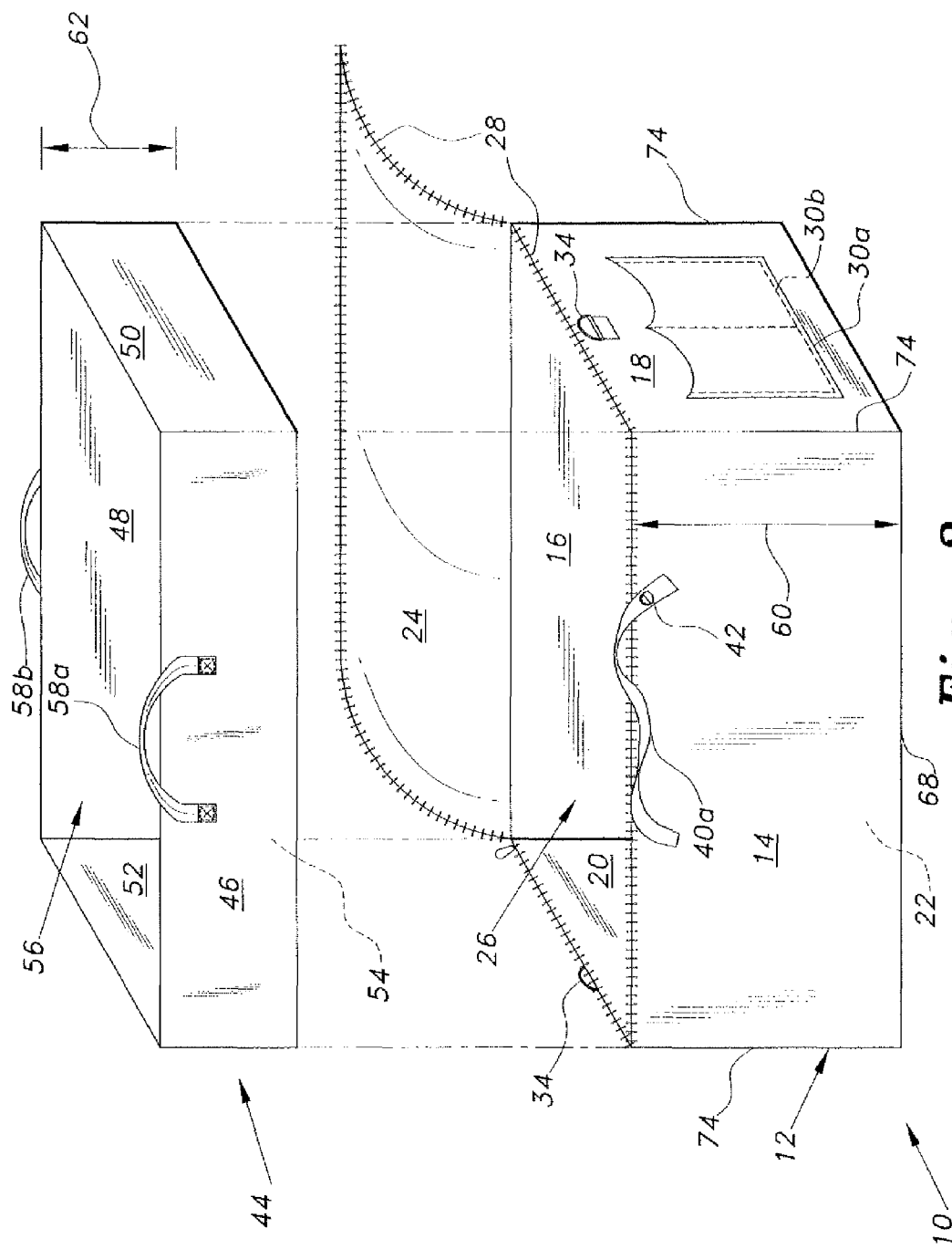
FIG. 2 is an exploded perspective view of the insulated container and insert according to the present invention, showing the top open and the insert removed from the outer container.

The insert 44 includes mutually opposed first and second side panels 46 and 48, as shown in FIGS. 2 and 4 of the drawings. Mutually opposed first and second end panels 50 and 52 define the ends of the insert 44. A bottom panel 54 completes the insert 44. The panels 46 through 54 define an insert volume 56 therein, as indicated in the insert 44 shown in FIGS. 2 and 4 of the drawings. The outer or lowermost surface or ply of the bottom panel 54 is preferably formed of a hydrophobic material having a very low coefficient of friction and very low adhesion to other materials, e.g., having a coating of polytetrafluoroethylene (e.g., Teflon®) or other suitable material, for reasons explained further below. The longitudinal and lateral dimensions of the insert 44 are such that it fits very closely within the interior of the outer bag 12 with essentially no gaps or spaces between the inner surface of the outer bag 12 and the outer surface of the insert 44 in order to substantially seal the insert 44 against the inner liner of the outer bag 12 when the insert 44 is installed therein. The insert 44 may be manufactured to have outer dimensions very slightly larger than the inner dimensions of the outer bag 12. The soft and flexible nature of the materials used permits the insert 44 to be pushed into the outer bag 12 to assure a tight fit therein. In any event, there is no other attachment means for securing the insert 44 within the outer bag 12. Laterally opposed first and second handles 58a and 58b, similar to the lateral handles 40a and 40b of the outer bag 12, may be provided to extend respectively from the upper portions or edges of the first and second side panels 46 and 48 of the insert 44 to facilitate the withdrawal of the insert 44 from the outer bag 12.

The side and end panels 14 through 20 of the outer bag 12 define an outer bag height 60, and the side and end panels 46 through 52 of the insert 44 define an insert height 62. It will be noted particularly in FIG. 1 of the drawings that the height 62 of the insert 44 is substantially half that of the height 60 of the outer bag 12. This provides a lower volume 64 within the outer bag 12 for the containment of ice or the like, beverage cans, etc. As this lower volume is substantially half the total volume 26 of the outer bag 12, a reasonable volume of ice, beverages, etc. may be carried in the lower volume 64 below the insert 44 when the insert is installed therein without the upper edge of the insert 44 extending above the upper edge of the outer bag 12, generally as shown in FIG. 1 of the drawings. The thermally insulating foam core of which the panels 46 through 54 of the insert 44 is made provide buoyancy to assure that the insert 44 will float atop ice and ice water contained in the lower volume 64 of the outer bag 12, while assuring that any air contained in this lower volume is minimized. Moreover, the very close fit of the insert 44 within the outer bag 12 substantially eliminates air circulation, thus further improving the thermal insulating efficiency of the container and insert assembly 10 when the insert 44 is installed within the outer bag 12.

FIGS. 3 and 4 of the drawings illustrate another feature of the insulated container and insert 10, or more specifically a feature of the outer bag 12 of the assembly, comprising a drop-down panel 66. The drop-down panel 66 may be attached to and extend from either the first or the second lateral edge 68 or 70 of the bottom panel 12, but in the example shown and described herein the panel 66 has its lower edge 72 permanently secured to the second lateral edge 70 of the bottom panel 12 along the juncture of the bottom panel 12 with the second side panel 16. The side and end panels 14 through 20 further define a plurality of vertical edges 74. The drop-down panel 66 substantially spans the width of the second side panel as defined by the vertical edges 74 of the junctures of the second side 16 with the first and second ends 18 and 20.

The drop-down panel 66 further is substantially congruent with the configurations of the two side panels 14 and 16. The side panel 66 has mutually opposed first and second edges 76 and 78 disposed very close to the corresponding vertical edges 74 of the outer bag 12 when the panel 66 is raised, generally as shown in FIG. 3 of the drawings. The lateral edges 76 and 78 of the drop-down panel 66 include mutually opposed first and second outer panel attachments 80 and 82 disposed adjacent thereto, while the corresponding edges of the second panel 16 have mating first and second drop-down panel attachments 84 and 86 disposed along the vertical edges 74 thereof. The attachments 80, 84 and 82, 86 may comprise mating strips of hook and loop fasteners or other attachment means (e.g., snaps, etc.).

The insulated container and insert 10 is used by initially placing ice, cold packs, or other means for lowering the temperature of the interior volume 26 of the outer bag 12 into the bottom of the outer bag 12. Beverage bottles or cans, etc. may also be placed in the bottom of the outer bag 12. The ice or cold packs lower or retain the cold temperature of the items placed therewith. The insert 44 may then be placed atop the ice, cold packs, and/or beverage containers within the lower portion of the outer container 12 so that the panels 46 through 52 of the insert 44 fit closely against the inner surfaces of the corresponding panels 14 through 20 of the outer bag 12 to substantially seal the ice and any other articles within the lower portion of the outer bag 12. Food and/or other articles that the user may wish to retain at colder than ambient temperatures may then be placed within the volume 56 of the insert 44, and the top panel 24 of the outer bag 12 closed and sealed by means of the zipper 28. The complete enclosure of the lower portion of the volume 26 of the outer bag 12, and thus the volume 56 of the insert 44 by the various insulated panels 14 through 24 of the outer bag 12, assures that the various articles (ice, drinks, food, etc.) placed therein will retain their cold temperatures for an extended period of time.

When the food, beverages, and/or other articles contained within the outer bag 12 are to be used or consumed, the lid or upper panel 24 of the outer bag 12 is opened by means of the zipper 28 for access to the contents thereof. However, it may be preferable to lower the drop-down panel 66 first. The drop-down panel 66 provides a clean surface for placement of the insert 44 thereon when the insulated container and insert 10 are transported to an area with a loose or sandy surface, such as a beach or other natural soil. While the outer surface of the bottom panel 54 of the insert 44 comprises a hydrophobic material to preclude substantial adhesion of water or ice thereto, there will still likely be some moisture adhering to this surface, and very light and fine particles of sand, soil, and/or other debris will likely adhere to the bottom panel 54 of the insert 44 in any event. The drop-down panel 66 thus assures that the bottom panel 54 of the insert 44 will not be contaminated with such foreign matter when the insert 44 is returned to the outer bag 12.

The waterproof liner or interior surfaces of the various panels 14 through 24 of the outer bag 12, and the outer surfaces of the panels 46 through 52 of the insert 44, ensure that cold water from melted ice cannot soak through either the outer bag 12 to dampen upholstery, carpeting, or other surfaces upon which the container and insert 10 may be placed. Moreover, the complete enclosure of the ice and cold water by the side panels and bottom panel 14 through 22 of the outer bag 12 and the bottom panel 54 of the insert 44 provides superior thermal insulation, even though the top panel or lid 24 of the outer bag may be open. The buoyancy of the insert 44 atop any water and/or ice within the lower portion of the outer bag 12 assures that all water and ice will remain below the insert 44 and will not work up between the walls or panels of the insert 44 and outer bag 12 to pour into the insert 44. However, any ice and/or excess water that may have formed within the bottom of the outer bag 12 may be poured out when no longer needed, and when use of the container and insert 10 is done. The insert 44 may be stored separately from the outer bag 12 until both are completely dry. The folded or collapsed insert 44 is then placed within the outer bag 12, and the outer bag 12 is folded or collapsed to minimize storage space until the next use thereof.

It is to be understood that the present invention is not limited to the embodiments described above, but encompasses any and all embodiments within the scope of the following claims.

I claim:

1. An insulated container and insert, comprising:
an outer bag having:
mutually opposed first and second side panels;
mutually opposed first and second end panels, the side panels and the end panels defining a plurality of vertical edges;
a bottom panel having mutually opposed first and second lateral edges; and
a top panel, the top panel being selectively closable, the panels defining an outer bag volume, the outer bag being formed of thermally insulating material having a soft, flexible thermally insulating core captured between an outer sheet and an inner liner of thin, flexible material, at least the inner liner being waterproof;
a single drop down panel selectively extending from the outer bag, the single drop down panel consisting of a lower edge and mutually opposed first and second lateral edges, the drop down panel being substantially congruent with at least one of the side panels of the outer bag when placed thereover, the lower edge of the drop down panel being permanently attached to the outer bag along one of the lateral edges of the bottom panel of the outer bag;
outer panel fasteners disposed adjacent each of the lateral edges of the drop down panel;
drop down panel fasteners disposed adjacent corresponding vertical edges of the outer bag, the outer panel fasteners of the drop down panel selectively attaching to the outer panel fasteners of the outer bag for selectively securing the outer panel to the corresponding side panel of the outer bag; and
an insert having mutually opposed first and second side panels, mutually opposed first and second end panels, a bottom panel, and an open top, the insert being free of attachment to the outer bag when the insert is placed within the outer bag, the first and second panels of the insert defining an insert volume, the insert being formed of thermally insulating material having a soft, flexible thermally insulating core captured between an outer sheet and an inner liner of thin, flexible material, at least the outer sheet being waterproof, wherein the side panels and the end panels of the outer bag define an outer bag height and the side panels and the end panels of the insert define an insert height substantially half the outer bag height, further wherein the outer dimensions of the insert are greater than the interior dimensions of the outer bag whereby the insert achieves a tight sealing fit with the outer bag when disposed therewithin, further wherein the single drop down panel is substantially congruent with the bottom panel of the insert thereby providing a clean surface for placement of the insert thereon when it is detached from the at least one side panel.

2. The insulated container and insert according to claim 1, the insulated container and insert further comprising:
first and second handles flexibly extending from the first and second side panels of the outer bag, respectively;
first and second strap attachments disposed upon the first and second end panels of the outer bag, respectively;
a strap removably secured to the first and second strap attachments and extending therebetween; and first and second handles flexibly extending respectively from the first and second side panels of the insert.

3. The insulated container and insert according to claim 1, wherein:
   the insert is buoyant; and
   the outer sheet of the insert substantially seals against the inner liner of the outer bag when the insert is installed within the outer bag.

4. The insulated container and insert according to claim 1, further comprising:
   at least one handle extending from at least one side panel of the outer bag; and
   a bottle opener secured to the handle.

5. The insulated container and insert according to claim 1, wherein the outer sheet of at least the bottom panel of the insert is formed of a hydrophobic material having a low coefficient of friction.

6. The insulated container and insert according to claim 1, further comprising:
   first and second laterally separated pockets disposed upon the first end panel of the outer bag; and
   a mesh pocket disposed upon the second end panel of the outer bag.

\* \* \* \* \*